United States Patent
Alexandru et al.

(10) Patent No.: US 10,079,754 B2
(45) Date of Patent: Sep. 18, 2018

(54) ADAPATIVE MESSAGE CACHES FOR REPLAY/FLOOD PROTECTION IN MESH NETWORK DEVICES

(71) Applicant: Freescale Semiconductor, Inc., Austin, TX (US)

(72) Inventors: Georgel Bogdan Alexandru, Bucharest (RO); Sorin Alexandru Bora, Bucharest (RO); Andrei Catalin Frincu, Pascani (RO)

(73) Assignee: NXP USA, Inc., Austin, TX (US)

( * ) Notice: Subject to any disclaimer, the term of this patent is extended or adjusted under 35 U.S.C. 154(b) by 260 days.

(21) Appl. No.: 15/045,772

(22) Filed: Feb. 17, 2016

(65) Prior Publication Data

US 2017/0171064 A1    Jun. 15, 2017

(30) Foreign Application Priority Data

Dec. 15, 2015   (RO) ............................... A201501008

(51) Int. Cl.

| | |
|---|---|
| *H04L 12/721* | (2013.01) |
| *H04W 12/06* | (2009.01) |
| *H04W 12/04* | (2009.01) |
| *H04L 12/741* | (2013.01) |
| *H04L 12/761* | (2013.01) |

(Continued)

(52) U.S. Cl.
CPC .............. *H04L 45/32* (2013.01); *H04L 45/16* (2013.01); *H04L 45/70* (2013.01); *H04L 45/74* (2013.01); *H04W 12/04* (2013.01); *H04W 12/06* (2013.01); *H04L 9/083* (2013.01); *H04L 9/321* (2013.01); *H04L 9/3271* (2013.01)

(58) Field of Classification Search
None
See application file for complete search history.

(56) References Cited

U.S. PATENT DOCUMENTS

| | | |
|---|---|---|
| 5,151,899 A | 9/1992 | Thomas et al. |
| 6,978,384 B1 | 12/2005 | Milliken |

(Continued)

OTHER PUBLICATIONS

Stamos et al , Microsoft Web service Security, scenarios, patterns, and implement ion guidance for web services enhances 3.0, 2005.*

(Continued)

*Primary Examiner* — Vinncelas Louis

(57) ABSTRACT

Adaptive message caches are disclosed for packet replay and/or flood protection in mesh network devices. The adaptive message cache includes a replay protection area (RPA) and a flood protection area (FPA). For each received packet, a packet security processor compares packet metadata to metadata entries stored for prior packets within the RPA to provide a replay protection check. If a replay protection check is not passed, the packet is dropped. If passed, the packet security processor compares the packet metadata to metadata entries stored for prior packets within the FPA to provide a flood protection check. If the flood protection check is not passed, the packet is dropped. If passed, the received packet is authenticated for the mesh network. Entries within the RPA/FPA are then updated using the packet metadata. Further, the sizes of the RPA and FPA can be adaptively adjusted based upon the packet metadata.

18 Claims, 5 Drawing Sheets

(51) Int. Cl.
   *H04L 9/32*          (2006.01)
   *H04L 9/08*          (2006.01)

(56) References Cited

U.S. PATENT DOCUMENTS

| | | |
|---|---|---|
| 7,406,082 B2 | 7/2008 | Nagarajan et al. |
| 8,396,985 B2 | 3/2013 | Wu |
| 8,474,034 B2 | 6/2013 | Zhang et al. |
| 8,761,181 B1 | 6/2014 | Gostev |
| 2007/0083923 A1 | 4/2007 | Fluhrer et al. |
| 2013/0086649 A1* | 4/2013 | Battistello ............. H04W 12/06 726/4 |

OTHER PUBLICATIONS

Zahn et al., "An Empirical Study of Flooding in Mesh Networks", Technical Report, Apr. 2009, 13 pgs.

* cited by examiner

ADAPATIVE MESSAGE CACHES FOR REPLAY/FLOOD PROTECTION IN MESH NETWORK DEVICES

RELATED APPLICATIONS

This application claims priority under 35 USC § 119 to Romanian Patent Application No. A201501008 filed on Dec. 15, 2015, and entitled "ADAPTIVE MESSAGE CACHES FOR REPLAY/FLOOD PROTECTION IN MESH NETWORK DEVICES," which application is hereby incorporated by reference in its entirety.

TECHNICAL FIELD

This technical field relates to packet communications within mesh networks and, more particularly, to management of received packets within mesh network devices.

BACKGROUND

In a flooded mesh network, each network node can communicate received packets to each other network node, and packets can take multiple different paths to reach a particular destination node. Because of the flooded nature of such a mesh network, network nodes within flooded mesh networks typically include message caching mechanisms that are used to limit network traffic. Uncontrolled flooding within a mesh network occurs when a network node receives the same packet from multiple neighboring nodes and forwards the packet each time it is received instead of only once. To avoid this uncontrolled flooding, network nodes can use the message cache to store information about the most recently received messages in order to avoid duplicate processing of the same packet received multiple times. This protection from uncontrolled duplicate processing is often called flood protection.

In a secure flooded mesh networks, each packet is typically authenticated with a secret group key that prevents an attacker from injecting malicious packets into the network. As such, the only practical attack on such secure flooded mesh networks is often a replay attack. A replay attack typically includes storing a prior message that has been correctly authenticated by a legitimate network node and then replaying it later when its effects will benefit the attacker. To protect against this attack, a network node can be configured to recognize that a received message has already been sent in the past and ignore it. This recognition of previously sent messages in often called replay protection. Prior replay protection solutions focus on storing the source sequence number (SSN) for each message source, checking all new sequence numbers, and accepting as valid only those within a certain window of sequence numbers.

Although it may seem that replay protection is a natural consequence of flood protection, the message caches within mesh network devices are typically limited in size and operate in a FIFO (first-in-first-out) manner when they become full. As such, for any given previously received message, the message cache may no longer hold the SSN for the message when the replayed message is received, thereby allowing the replay attack to become possible. Although the message cache can be increased in size to address this size limitation issue, many network nodes within a mesh network are resource constrained devices where increasing size allocations to message cache tables within device memory is not practical due to limitations on the device memory size.

DESCRIPTION OF THE DRAWINGS

It is noted that the appended figures illustrate only example embodiments and are, therefore, not to be considered as limiting the scope of the present invention. Elements in the figures are illustrated for simplicity and clarity and have not necessarily been drawn to scale.

DETAILED DESCRIPTION

Figure 1:
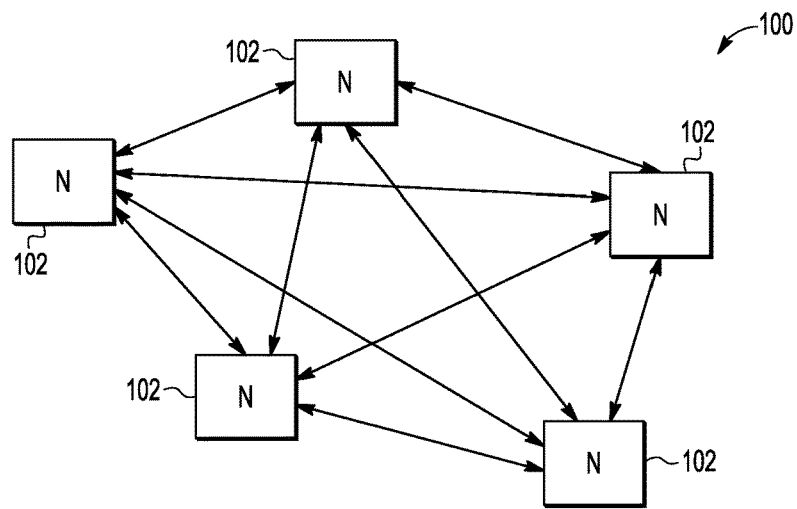
FIG. 1 is a block diagram of an example embodiment for a mesh network including multiple network nodes.

Adaptive message caches are disclosed for packet replay and/or flood protection in mesh network devices. The adaptive message cache for a network mesh device includes a replay protection area (RPA) and a flood protection area (FPA). When packets are received by a mesh network device, a packet security processor compares metadata for each received packet to metadata entries stored for prior packets within the RPA to provide a replay protection check. If the replay protection check is not passed, the packet is dropped. If the replay protection check is passed, the packet security processor compares the metadata for the received packet to metadata entries stored for prior packets within the FPA to provide a flood protection check. If the flood protection check is not passed, the packet is dropped. If the flood protection check is passed, the received packet can then be authenticated using a security key for the mesh network. Entries within the RPA/FPA are then updated using the metadata for the received packet. Further, the sizes of the RPA and FPA within the message cache can be adaptively adjusted based upon the metadata for the received packet. In addition, the message cache can have a fixed size; the FPA can have a minimum FPA size; and the metadata entries can include a source identifier (SID) and a source sequence number (SSN) for the received packet. A variety of additional or different features and variations can also be implemented.

In operation, the disclosed embodiments manage message caches within mesh network devices to provide adaptive replay protection in addition to dynamic message filtering for flood protection. The disclosed embodiments are particularly useful for such network devices that are resource constrained (e.g., limited memory resources) and are operating within flooded mesh networks with authenticated packet protocols. In part, the disclosed embodiments generate and store packet metadata for received packets in order to track individual messages being communicated within the mesh network and to manage an adaptive message cache (AMC) that contains a limited number of packet metadata entries based upon the message cache size (MCS). The metadata for each received packet can include, for example, a source identifier (SID) and a source sequence number (SSN) for the received packet. The message cache includes a replay protection area (RPA) and a flood protection area (FPA) that are adaptively managed and adjusted by a packet security processor as packets are received over time. For one embodiment, the RPA is increased in size over time while the FPA is reduced in size over time until the FPA reaches a minimum size and/or until a security update for the mesh network is confirmed, at which time the message cache is cleared and reset to its initial conditions. Once a packet has passed through the replay and flood protection security checks, the packet can also be authenticated, used to update the RPA/FPA, and then provided to a packet processor for further actions by the network device.

FIG. 1 is a block diagram of an example embodiment for a mesh network 100 including multiple network nodes 102. Each network node 102 is configured to communicate packets within the mesh network 100 with each other network node 102. As described herein, the mesh network 100 can be a flooded mesh network in that packets can be communicated through the mesh network 100 using multiple different paths such that a destination network node as well as intermediate network nodes can receive a particular packet from multiple source nodes. The mesh network 100 can also be a secure flooded mesh network where each packet is authenticated by the network nodes 102 prior to being processed and/or forwarded on to other network nodes. Although five network nodes are shown, different numbers of network nodes could be used. It is further noted that the network nodes can be any network connected device that is configured to receive and process packets within the mesh network 110.

Figure 2:
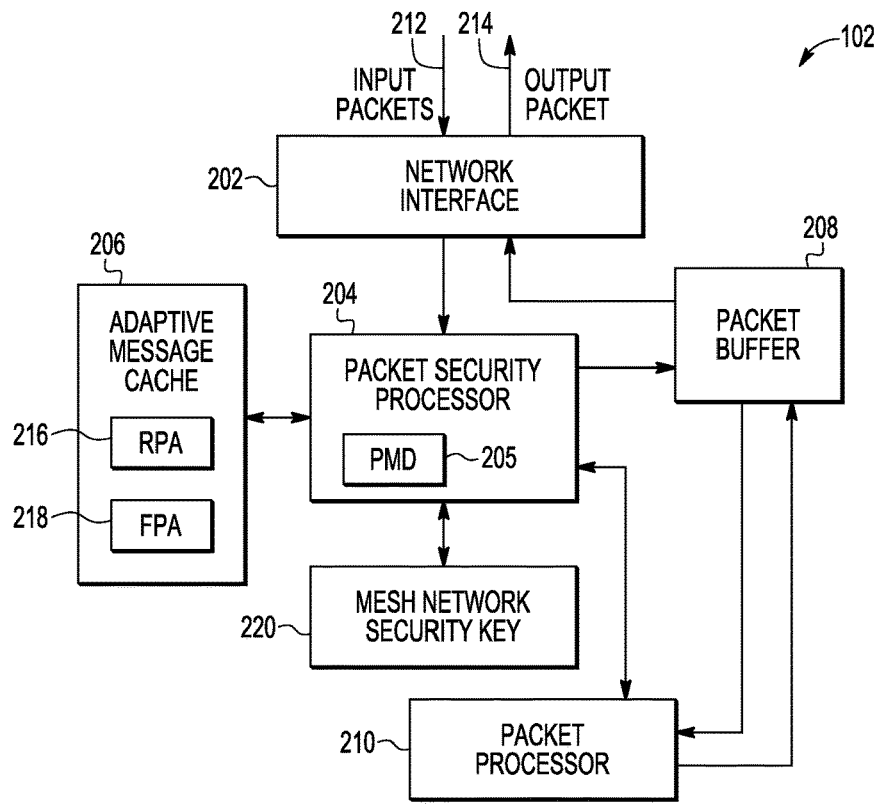
FIG. 2 is a block diagram of an example embodiment for a network device that represents a network node within a mesh network.

FIG. 2 is a block diagram of an example embodiment for a network device that represents network node 102 within the mesh network 100. Input packets 212 are received by network interface 202 and are provided to a packet security processor 204. The packet security processor 204 generates packet metadata (PMD) 205 for the each received packet 212 and compares it to packet metadata entries stored in the adaptive message cache (AMC) 206 to provide replay and flood protection checks. The packet metadata 205 for each received packet can include, for example, a source identifier (SID) and a source sequence number (SSN) included within the received packet. The adaptive message cache 206 includes a replay protection area (RPA) 216 and a flood protection area (FPA) 218 which are adaptively managed by the packet security processor 204, as described in more detail below. If RPA and FPA checks are passed and packet authentication is enabled, the packet security processor 204 then uses a security key 220 for the mesh network to determine if the received packet is authenticated for the secure mesh network. If the received packet passes this authentication check, the packet is stored in the packet buffer 208 for processing by the packet processor 210. The packet metadata 205 is also used to update the RPA 216 and/or the FPA 218 as described further below. If the network device is not the destination node for the received packet, then the packet processor can also store the processed packet in the packet buffer 208 and then forward the processed packet through the network interface to one or more other network nodes within the mesh network. As such, output packets 214 can include packets generated by the network device itself and/or packets received by the network device and forwarded on to other network nodes 102 with the mesh network 100.

As described above the packet metadata (PMD) 205 generated for each packet can include an SID and an SSN, although other information could also be used for the packet metadata (PMD) 205. For embodiments that use an SID and an SSN for the packet metadata (PMD) 205, it is assumed that the packets communicated within the mesh network and received as input packets 212 will include information within one or more packet headers that includes the SID/SSN and/or will allow determination of the SID/SSN for each packet. An SID is a unique identifier, such as a unique identification number, that uniquely identifies each device that is able to send messages into the mesh network 100. The SID can be, for example, derived from and/or equal to a device's network address such as an IP (Internet Protocol) address. An SSN is a message number and can be generated by a network device, for example, using a counter that is incremented by one when the device sends a new message. As such, each sent message from a particular source device has a unique message number. It is preferable that the communication protocol for the mesh network be configured such that the SSN never overflows within a network device. An overflow can occur, for example, when a counter reaches a maximum count number and must be reset to its initial counter value before being able to be further incremented for new packets. One technique for preventing such an overflow is to issue periodic security updates within the mesh network where source devices reset their source sequence numbers (e.g., reset a sequence counter). Other techniques could also be used. Once generated or extracted from the received packet, the SID and the SSN are used as packet metadata (PMD) 205 that uniquely identifies the received packet.

Figure 3:
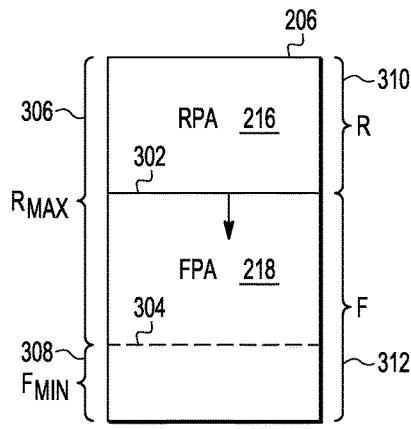
FIG. 3 is a block diagram of an example embodiment for an adaptive message cache for a network device within a mesh network.

FIG. 3 is a block diagram of an example embodiment for the adaptive message cache 206. The adaptive message cache 206 is configured to store metadata entries. For example, where an SID and an SSN are used as the packet metadata 205, each entry within the adaptive message cache is configured to hold an SID/SSN data pair. As described above, the adaptive message cache 206 includes a replay protection area (RPA) 216 and a flood protection area 218. The size (R) 310 of the RPA 216 and the size (F) 312 of the FPA 218 are adaptively managed, as represented by line 302, such that their relative sizes within the total message cache size (MCS) for the adaptive message cache 206 change as the network device operates over time. In particular, after the RPA 216 is reset to an initial size, the RPA 216 is increased in size over time as described below, and the FPA 218 is decreased in size over time to accommodate the increases in the size of the RPA 216. However, the FPA 218 can also be configured to have a minimum size ($F_{MIN}$) 308 represented by dashed line 304 such that the size 312 of the FPA 218 is not allowed to drop below dashed line 304 which represents the minimum size ($F_{MIN}$) 308 for the FPA 218. As such, the RPA 216 effectively has a maximum size ($R_{MAX}$) 306 when the FPA 218 is at its minimum size ($F_{MIN}$) 308. In one embodiment, the initial size (F) 312 for the FPA 218 can be set equal to the entire message cache size (MCS), and the initial size (R) 310 for the RPA 216 can be set to zero. The size (R) 310 for the RPA 216 and the size (F) 312 for the FPA 218 are then dynamically managed over time with the following restrictions: F+R=MCS, $F \geq F_{MIN}$, and $R \leq R_{MAX}$. Other variations could also be implemented.

Figure 4:
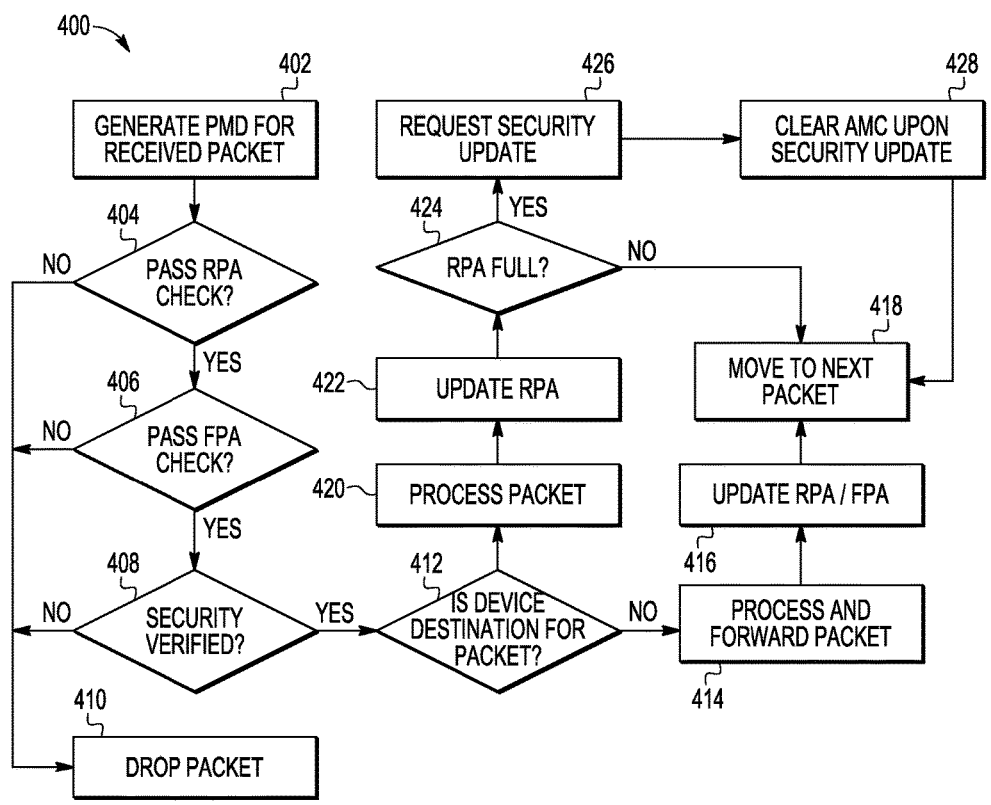
FIG. 4 is a process flow diagram of an example embodiment to dynamically manage the relative sizes for a replay protection area (RPA) and a flood protection area (FPA) with an adaptive message cache.

FIG. 4 is a process flow diagram of an example embodiment 400 to adaptively manage and adjust the relative sizes for the RPA 216 and the FPA 218. In block 402, packet metadata (PMD) 205 is generated for a received packet (e.g., SID, SSN). In block 404, a determination is made whether the packet passes a replay protection check based upon a comparison of the PMD 205 for the received packet to PMD entries stored in the RPA 216. If the determination is "NO," then flow passes to block 410 where the packet is dropped. If the determination is "YES," then flow passes to block 406. In block 406, a determination is made whether the packet passes a flood protection check based upon a comparison of the PMD for the received packet to PMD entries stored in the FPA 218. If the determination is "NO," then flow passes to block 410 where the packet is dropped. If the determination is "YES," then flow passes to block 408. In block 408, a determination is made whether the received packet passes a security verification. This security verification, for example, can include authenticating the received packet using a security key 220 for the mesh network. This secret key 220 can be used, for example, as part public/private key encryption applied to MAC (media access control) addresses for devices that are group members of the mesh network. Other security verification techniques could also be used for the secure mesh network. If the security verification determination in block 408 is "NO," then flow passes to block 410 where the packet is dropped. If the determination in block 308 is "YES," then flow passes to block 412.

It is noted that the RPA check in block 404 and the FPA check in block 406 can be based upon a determination of whether a received packet 212 appears to be received out of order from a particular source node. For one example embodiment where the PMD 205 includes an SID and an SSN, the replay protection check in block 404 is determined based upon a comparison of the SID and SSN for each received packet with SID/SSN data pairs for previously received packets that are stored within PMD entries for the RPA 216. The RPA check in block 404 is considered a pass: (1) if there is no SID within the RPA 216 that matches the SID for the received packet, or (2) where there is an SID match within the RPA 216, the SSN for the received packet is greater than the SSN stored in the PMD entry along with the matching SID. Similar to the RPA check, the flood protection check in block 406 is determined based upon a comparison of the SID and SSN for each received packet with SID/SSN data pairs for previously received packets that are stored within PMD entries for the FPA 218. The FPA check in block 406 is similarly considered a pass: (1) if there is no SID within the FPA 218 that matches the SID for the received packet, or (2) where there is an SID match within the FPA 218, the SSN for the received packet is greater than the SSN stored in the PMD entry along with the matching SID.

Looking now to block 412, a determination is made whether the receiving device is the destination node for the received packet. For example, a destination identifier (DID) within the packet header information can be used to identify the intended destination node for the packet. If "NO," then flow passes to block 414 where the packet is processed and forwarded to further nodes 102 within the mesh network 100. Block 416 is then reached where the RPA 216 and the FPA 218 are updated with the PMD 205 for the received packet, as described in further detail below with respect to FIG. 5. Block 418 is then reached where a next packet is processed for RPA/FPA checks and security verification.

If the determination in block 412 is "YES," then block 420 is reached where the received packet is processed by the network device as the end-point destination device. Block 422 is then reached where the RPA 216 is updated with the PMD 205 for the received packet, as described in more detail below with respect to FIG. 6. If a PMD entry is to be added to the RPA 216 as part of this update and a "NO" determination is made in block 424 that the RPA is not full, then flow passes to block 418 where the next packet is processed. However, if a PMD entry is to be added to the RPA 216 and a "YES" determination is made in block 424 that the RPA is full, then flow passes to block 426 where a security update can be requested by the network device. In block 428, when a security update is confirmed for the mesh network, the PMD entries within the adaptive message cache 206 is cleared, and the RPA 216 and the FPA 218 are reset to their initial sizes. Flow then passes back to block 418 where the next packet is processed.

Figure 5:
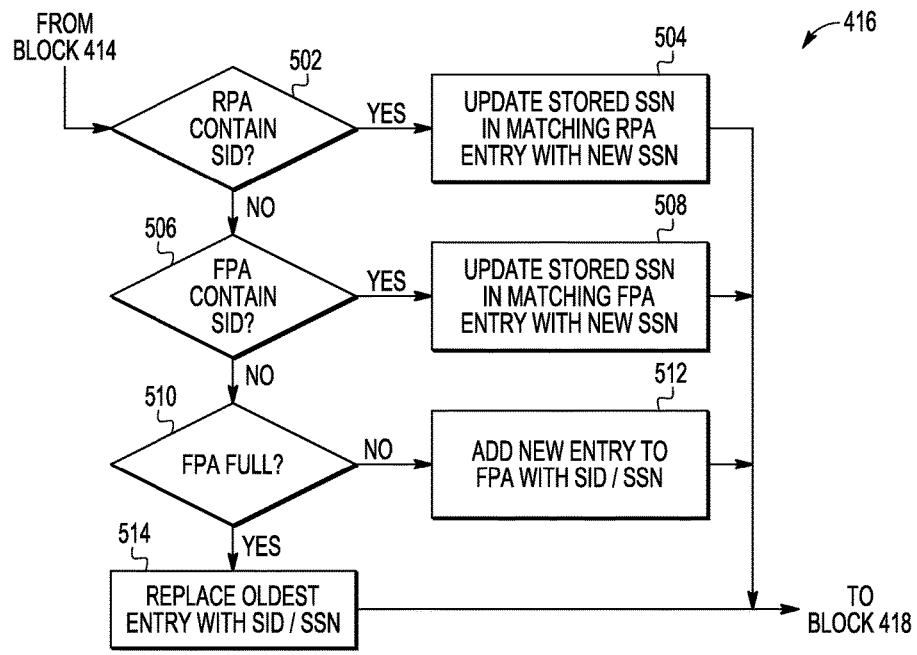
FIG. 5 is a process flow diagram of an example embodiment for block 416 in FIG. 4 to update the RPA or the FPA where the network device is not the destination node.

FIG. 5 is a process flow diagram of an example embodiment for block 416 in FIG. 4 to update the RPA 216 or the FPA 218 where the network device is not the destination node. In block 502, a determination is made whether the RPA 216 includes a PMD entry that has an SID that matches the SID for the PMD 205 of the newly received packet. If "YES," then the SSN for the matching RPA entry is updated in block 504 with the SSN within the PMD 205 for the newly received packet. Flow then passes on to block 418. If "NO," then a determination is made in block 506 whether the FPA 218 includes a PMD entry that has an SID that matches the SID for the PMD 205 of the newly received packet. If "YES," then the SSN for the matching FPA entry is updated in block 508 with the SSN within the PMD 205 for the newly received packet. Flow then passes on to block 418. If "NO," then flow passes to block 510 where a determination is made whether the FPA 218 is full, for example, where all available memory locations within the FPA 218 have been filled with PMD entries for prior packets. If "NO," then flow passes to block 512 where a new entry is added to the FPA 218 to store PMD 205 for the received packet (e.g., SID and SSN). Flow then passes on to block 418. If "YES," then flow passes to block 514 where the PMD 205 for the received packet (e.g., SID and SSN) replaces the oldest entry currently within the FPA 218. Flow then passes to block 418.

Figure 6:
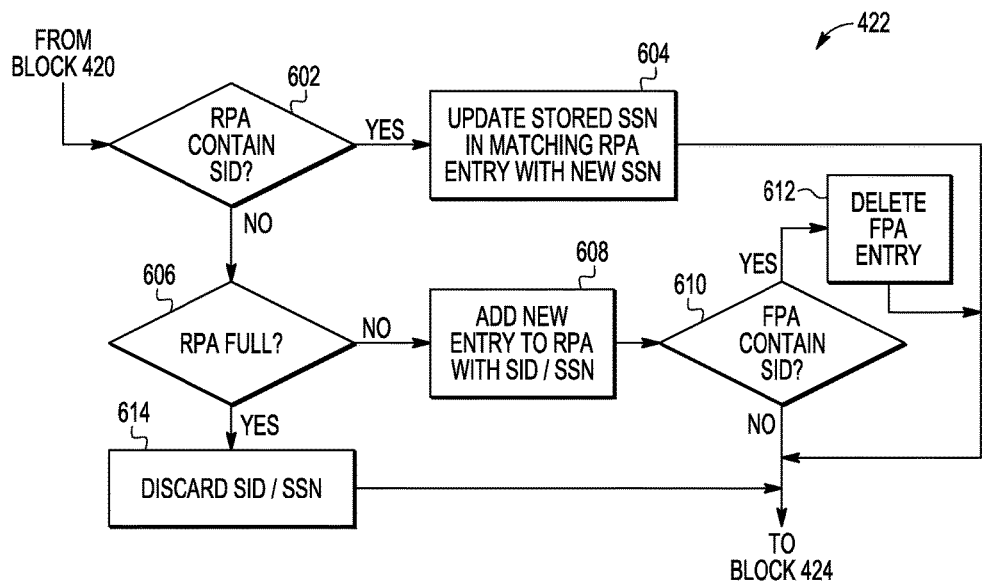
FIG. 6 is a process flow diagram of an example embodiment for block 422 in FIG. 4 to update the RPA where the network device is the destination node.

FIG. 6 is a process flow diagram of an example embodiment for block 422 in FIG. 4 to update the RPA 216 where the network device is the destination node. In block 602, a determination is made whether the RPA 216 includes a PMD entry that has an SID that matches the SID for the PMD 205 of the newly received packet. If "YES," then the SSN for the matching RPA entry is updated in block 604 with the SSN within the PMD 205 for the newly received packet. Flow then passes on to block 424. If "NO," then flow passes to block 606 where a determination is made whether the RPA 216 is full, for example, where the RPA 216 has reach its maximum level ($R_{MAX}$) and the FPA 218 has reached its minimum level ($F_{MIN}$). If "YES," then flow passes to block 614 where the PMD 205 for the received packet (e.g., SID and SSN) is discarded. Flow then passes to block 424. If "NO," then flow passes to block 608 where the RPA 216 is expanded to add a new entry with the PMD 205 for the received packet (e.g., SID and SSN). When the RPA 216 is expanded by one entry, the FPA 218 is decreased by one entry. A determination is then made in block 610 whether the FPA 218 also includes an FPA entry that has an SID that matches the SID for the PMD 205 of the received packet. If "NO," flow passes on to block 424. If "YES," then flow passes to block 612 where the matching FPA entry is deleted. Flow then passes to block 424.

Figure 7:
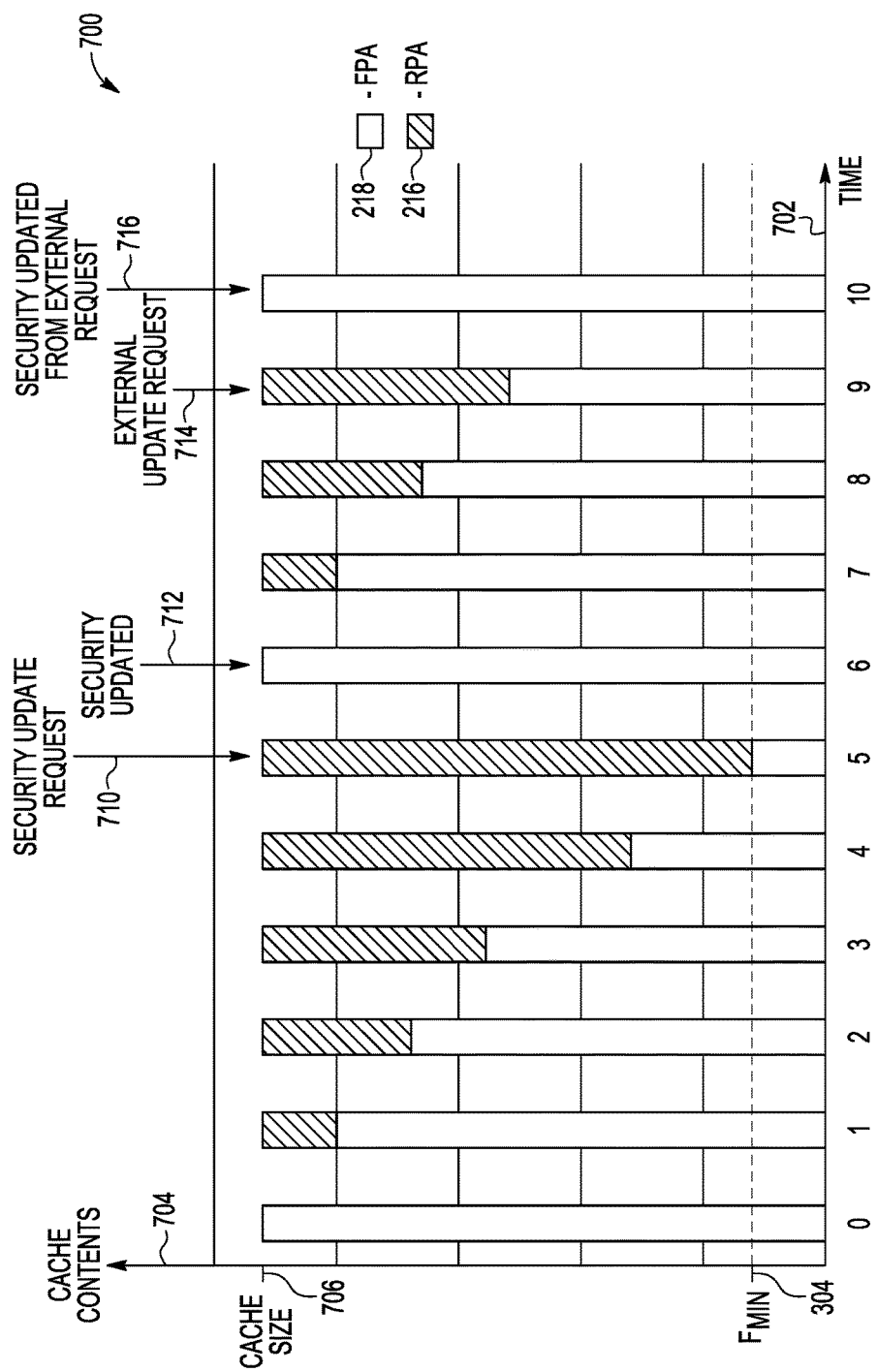
FIG. 7 is a diagram of an example embodiment for cache contents for the RPA and the FPA as they are adaptively adjusted over time.

FIG. 7 is a diagram of an example embodiment 700 for cache contents for the RPA 216 and the FPA 218 within an adaptive message cache 206 as they are adaptively adjusted over time. For the example embodiment 700 depicted, the y-axis 704 represents cache contents, and the x-axis 702 represents time. In addition, for example embodiment 700, it is assumed that the overall cache size 706 remains constant. At Time0, the FPA 218 is initially set to include the entire adaptive message cache 208, and the RPA 216 is initially set to zero. Over the next five time periods (Time1, Time2, Time3, Time4, and Time5), the RPA 216 level increases until the FPA 218 is at its minimum level ($F_{MIN}$) 304 and the RPA 216 is at its maximum level ($R_{MAX}$) 306. As represented by arrow 710 associated with Time5, a security update request is issued by the network device at the point the RPA 216 is full. As represented by arrow 712 associated with Time6, the security update has been confirmed, and the FPA 218 is reset to its initial maximum level of the entire adaptive message cache 208. The RPA 216 is also reset to its initial zero level. Over the next three time periods (Time7, Time8, and Time9), the size of the RPA 216 increases and the size of the FPA 218 decreases. As represented by arrow 714 associated with Time9, an external update request from an external network node is issued. As represented by arrow 716 associated with Time10, the security update has been confirmed, and the FPA 218 is reset to its initial maximum level of the entire adaptive message cache 208. The RPA 216 is also reset to its initial zero level. It is noted that when the security update occurs, the source sequence number for the network device can also be reset. Other actions can also be taken, as desired, upon the security update event.

Figure 8:
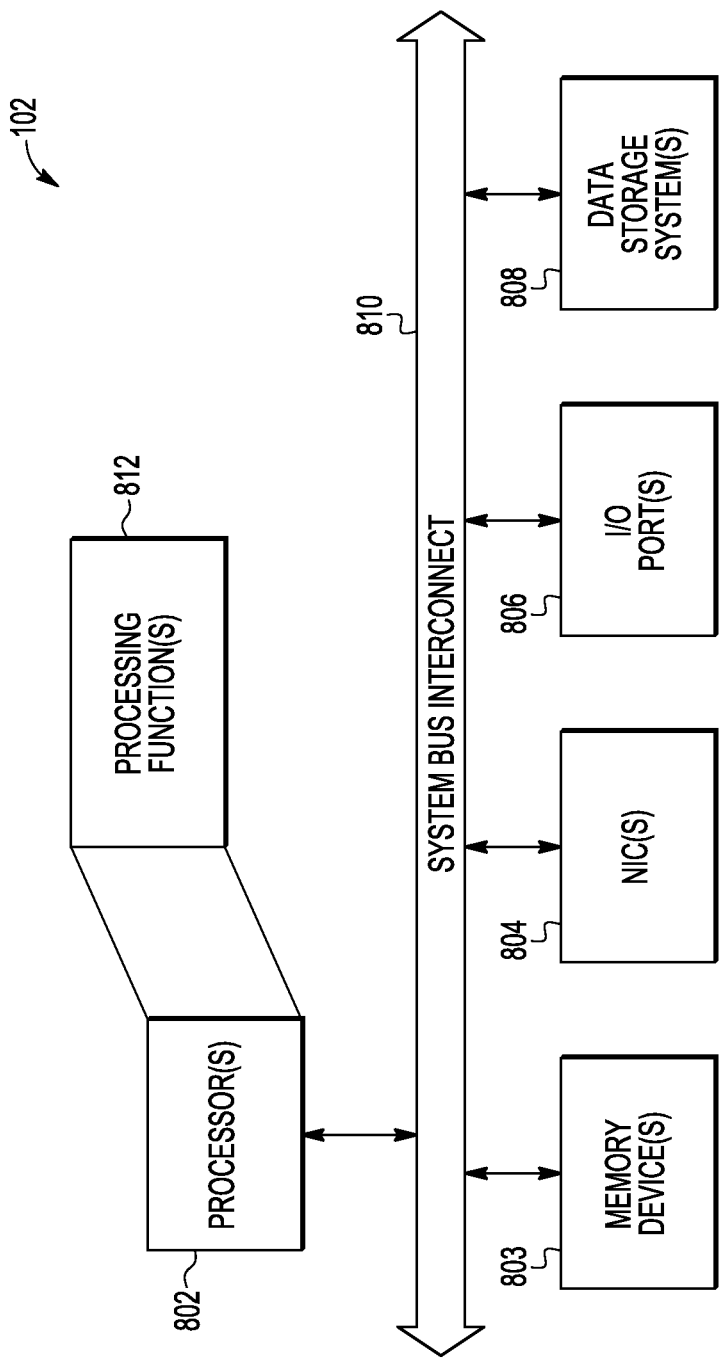
FIG. 8 is a block diagram of an example embodiment of a hardware environment for a network device within the mesh network.

FIG. 8 is a block diagram of an example embodiment 800 of a hardware environment for a network device 102 within the mesh network 100. For the example embodiment 800 depicted, the hardware environment includes one or more processors 802 programmed or otherwise configured to implement the one or more processing functions 812 for the embodiments described herein. The hardware environment also includes one or more network interface cards (NICs) 804, one or more input/output (I/O) ports 806, one or more non-volatile data storage systems 808, and one or more memory devices 803 coupled to communicate with each other through a system bus interconnect 810. The data storage system(s) 808 can store one or more software modules that represent instructions that can be executed by the processor(s) 802 to carry out the functions described herein. In operation, the processors 802 load and execute software code and/or programming instructions stored in the data storage systems 808 to perform the processing functions described herein. For example, the packet security processor 204 can be implemented using software instructions that when executed by the one or more processors 802 cause the security functions described herein to be performed, and the packet processor 210 can also be implemented using software instructions that when executed by the one or more processors 802 cause the packet processing and forwarding functions described herein to be performed. The memory devices 803 can be used by the processors 802 to load and execute the software instructions stored in the data storage systems 808, and the adaptive message cache 206 can also be stored in the memory devices 803 during operation of the network device 102.

It is further noted that different and/or additional components could also be used to implement the network devices or nodes 102 while still taking advantage of the efficient adaptive message cache management techniques described herein. It is further noted that the system bus 810 can be implemented as multiple interconnection buses with our without additional intervening circuitry. Further, it is noted that the processor(s) 802 can be implemented using one or more processing devices including controllers, microcontrollers, microprocessors, central processing units, hardware accelerators, configurable logic devices (e.g., field programmable gate arrays), and/or other processing devices. In addition, data storage system(s) 808 can be implemented as any desired non-transitory tangible medium that stores data, such as data storage devices, FLASH memory, random access memory, read only memory, programmable memory devices, reprogrammable storage devices, hard drives, floppy disks, DVDs, CD-ROMs, and/or any other non-transitory data storage mediums. The memory devices 803 can be any such data storage medium configured to maintain data storage when the network device is powered. Other variations could also be implemented.

As described herein, a variety of embodiments can be implemented and different features and variations can be implemented, as desired.

For one embodiment, a method for replay protection in a mesh network device is disclosed including receiving, at a network interface for a mesh network device, a packet from a mesh network; generating metadata associated with the received packet; performing a replay protection check by comparing the metadata for the received packet to metadata entries stored for prior packets within a replay protection area (RPA) of a message cache; dropping the received packet if the replay protection check is not passed; if the replay protection check is passed, performing a flood protection check by comparing the metadata for the received packet to metadata entries for prior packets within a flood protection area (FPA) of the message cache; and dropping the received packet if the flood protection check is not passed.

In additional embodiments, the method further includes, if the flood protection check is passed, authenticating the received packet based upon a security key for the mesh network and updating the RPA or the FPA using the metadata for the received packet.

In additional embodiments, the method includes adaptively adjusting the size of the RPA and the size of the FPA within the message cache based upon the metadata for the received packet such that if the size of the RPA is increased, the size of the FPA is decreased. In some embodiments, the message cache has a fixed size, and the size of the FPA is not adjusted below a minimum FPA size. In further embodiments, the metadata for the received packet includes a source identifier (SID) and a source sequence number (SSN) for the received packet, and the metadata entries include a source identifier (SID) and a source sequence number (SSN) for previously received packets. In still further embodiments, the replay protection check and the flood protection check are passed: if there is no SID within the RPA or the FPA, respectively, that matches the SID for the received packet; or if there is an SID match within the RPA or the FPA, respectively, the SSN for the received packet is greater than an SSN stored in a metadata entry along with the matching SID.

In additional embodiments, the method further includes, if the mesh network device is a destination device for the received packet, updating the RPA and the FPA by:
    if the RPA includes a metadata entry with a matching SID to the SID for the received packet, updating the metadata entry within the RPA with the SSN for the received packet;

if the RPA does not include a metadata entry with a matching SID to the SID for the received packet and the FPA includes a metadata entry with a matching SID to the SID for the received packet, updating the metadata entry within the FPA with the SSN for the received packet; and if the RPA and the FPA do not include a metadata entry with a matching SID to the SID for the received packet, adding a new metadata entry to the FPA with the SID and the SSN for the received packet.

In further embodiments, the method also includes determining if the FPA is full prior to adding the new metadata entry and, if the FPA is full, replacing an oldest existing metadata entry within the FPA with the SID and the SSN for the received packet.

In additional embodiments, the method further includes, if the mesh network device is not a destination device for the received packet, updating the RPA by:

if the RPA includes a metadata entry with a matching SID to the SID for the received packet, updating the metadata entry within the RPA with the SSN for the received packet; and if the RPA does not include a metadata entry with a matching SID to the SID for the received packet, adding a new metadata entry to the RPA with the SID and the SSN for the received packet.

In further embodiments, the method also includes determining if the RPA is full prior to adding the new metadata entry and, if the RPA is full, discarding the SID and the SSN for the received packet.

For one embodiment, a mesh network device having replay protection is disclosed including, a network interface configured to receive packets from a mesh network, a message cache having a replay protection area (RPA) and a flood protection area (FPA), and a packet security processor. The packet security processor is configured for each received packet to generate metadata associated with the received packet, to compare the metadata for the received packet to metadata entries stored for prior packets within the RPA to perform a replay protection check, to drop the received packet if the replay protection check is not passed, and if the replay protection check is passed, to further compare the metadata for the received packet to metadata entries within the FPA to perform a flood protection check and to drop the received packet if the flood protection check is not passed.

In additional embodiments, the mesh network device further includes, if the flood protection check is passed, the packet security processor is further configured to authenticate each received packet based upon a security key for the mesh network and to update the RPA or the FPA using the metadata for the received packet.

In additional embodiments, the packet security processor is further configured to adaptively adjust the size of the RPA and the size of the FPA within the message cache such that if the size of the RPA is increased, the size of the FPA is decreased. In some embodiments, the message cache has a fixed size, and the packet security processor is configured not to adjust the size of the FPA below a minimum FPA size. In further embodiments, the metadata for each received packet includes a source identifier (SID) and a source sequence number (SSN) for the received packet, and the metadata entries include a source identifier (SID) and a source sequence number (SSN) for previously received packets. In still further embodiments, the packet security processor is configured to consider the replay protection check and the flood protection check as passed: if there is no SID within the RPA or the FPA, respectively, that matches the SID for the received packet; or if there is an SID match within the RPA or the FPA, respectively, the SSN for the received packet is greater than an SSN stored in a metadata entry along with the matching SID.

In additional embodiments, the packet security processor is further configured, if the mesh network device is a destination device for the received packet, to update the RPA and the FPA by:

if the RPA includes a metadata entry with a matching SID to the SID for the received packet, updating the metadata entry within the RPA with the SSN for the received packet;

if the RPA does not include a metadata entry with a matching SID to the SID for the received packet and the FPA includes a metadata entry with a matching SID to the SID for the received packet, updating the metadata entry within the FPA with the SSN for the received packet; and if the RPA and the FPA do not include a metadata entry with a matching SID to the SID for the received packet, adding a new metadata entry to the FPA with the SID and the SSN for the received packet.

In further embodiments, the packet security processor is further configured to determine if the FPA is full prior to adding the new metadata entry and, if the FPA is full, to replace an oldest existing metadata entry within the FPA with the SID and the SSN for the received packet.

In additional embodiments, the packet security processor is further configured, if the mesh network device is not a destination device for the received packet, to update the RPA by:

if the RPA includes a metadata entry with a matching SID to the SID for the received packet, updating the metadata entry within the RPA with the SSN for the received packet; and if the RPA does not include a metadata entry with a matching SID to the SID for the received packet, adding a new metadata entry to the RPA with the SID and the SSN for the received packet.

In further embodiments, the packet security processor is further configured to determine if the RPA is full prior to adding the new metadata entry and, if the RPA is full, to discard the SID and the SSN for the received packet.

It is further noted that the functional blocks, devices, and/or circuitry described herein can be implemented using hardware, software, or a combination of hardware and software. In addition, one or more processing devices (e.g., central processing units (CPUs), controllers, microcontrollers, microprocessors, hardware accelerators, processors, programmable integrated circuitry, FPGAs (field programmable gate arrays), ASICs (application specific integrated circuits), and/or other processing devices) executing software and/or firmware instructions can be used to implement the disclosed embodiments. It is further understood that one or more of the operations, tasks, functions, or methodologies described herein can be implemented, for example, as software, firmware and/or other program instructions that are embodied in one or more non-transitory tangible computer-readable mediums (e.g., data storage devices, flash memory, random access memory, read only memory, programmable memory devices, reprogrammable storage devices, hard drives, floppy disks, DVDs, CD-ROMs, and/or any other tangible data storage medium) and that are executed by one or more processing devices (e.g., central processing units (CPUs), controllers, microcontrollers, microprocessors, hardware accelerators, processors, programmable integrated circuitry, FPGAs (field programmable gate arrays), ASICs (application specific integrated circuits), and/or other processing devices) to perform the operations, tasks, functions, or methodologies described herein.

Unless stated otherwise, terms such as "first" and "second" are used to arbitrarily distinguish between the elements such terms describe. Thus, these terms are not necessarily intended to indicate temporal or other prioritization of such elements.

Further modifications and alternative embodiments of the described systems and methods will be apparent to those skilled in the art in view of this description. It will be recognized, therefore, that the described systems and methods are not limited by these example arrangements. It is to be understood that the forms of the systems and methods herein shown and described are to be taken as example embodiments. Various changes may be made in the implementations. Thus, although the invention is described herein with reference to specific embodiments, various modifications and changes can be made without departing from the scope of the present invention. Accordingly, the specification and figures are to be regarded in an illustrative rather than a restrictive sense, and such modifications are intended to be included within the scope of the present invention. Further, any benefits, advantages, or solutions to problems that are described herein with regard to specific embodiments are not intended to be construed as a critical, required, or essential feature or element of any or all the claims.

What is claimed is:

1. A method for replay protection in a mesh network device, comprising:
   receiving, at a network interface for a mesh network device, a packet from a mesh network;
   generating metadata associated with the received packet;
   performing a replay protection check by comparing the metadata for the received packet to metadata entries stored for prior packets within a replay protection area (RPA) of a message cache;
   dropping the received packet if the replay protection check is not passed;
   if the replay protection check is passed, performing a flood protection check by comparing the metadata for the received packet to metadata entries for prior packets within a flood protection area (FPA) of the message cache;
   dropping the received packet if the flood protection check is not passed; and
   adaptively adjusting a size of the RPA and a size of the FPA within the message cache based upon the metadata for the received packet such that if the size of the RPA is increased, the size of the FPA is decreased.

2. The method of claim 1, further comprising, if the flood protection check is passed, authenticating the received packet based upon a security key for the mesh network and updating the RPA or the FPA using the metadata for the received packet.

3. The method of claim 1, wherein the message cache has a fixed size, and wherein the size of the FPA is not adjusted below a minimum FPA size.

4. The method of claim 1, wherein the metadata for the received packet comprises a source identifier (SID) and a source sequence number (SSN) for the received packet, and wherein the metadata entries comprise a source identifier (SID) and a source sequence number (SSN) for previously received packets.

5. The method of claim 4, wherein the replay protection check and the flood protection check are passed:
   if there is no SID within the RPA or the FPA, respectively, that matches the SID for the received packet, or
   if there is an SID match within the RPA or the FPA, respectively, the SSN for the received packet is greater than an SSN stored in a metadata entry along with the matching SID.

6. The method of claim 4, further comprising, if the mesh network device is a destination device for the received packet, updating the RPA and the FPA by:
   if the RPA includes a metadata entry with a matching SID to the SID for the received packet, updating the metadata entry within the RPA with the SSN for the received packet;
   if the RPA does not include a metadata entry with a matching SID to the SID for the received packet and the FPA includes a metadata entry with a matching SID to the SID for the received packet, updating the metadata entry within the FPA with the SSN for the received packet; and
   if the RPA and the FPA do not include a metadata entry with a matching SID to the SID for the received packet, adding a new metadata entry to the FPA with the SID and the SSN for the received packet.

7. The method of claim 6, further comprising determining if the FPA is full prior to adding the new metadata entry and, if the FPA is full, replacing an oldest existing metadata entry within the FPA with the SID and the SSN for the received packet.

8. The method of claim 4, further comprising, if the mesh network device is not a destination device for the received packet, updating the RPA by:
   if the RPA includes a metadata entry with a matching SID to the SID for the received packet, updating the metadata entry within the RPA with the SSN for the received packet; and
   if the RPA does not include a metadata entry with a matching SID to the SID for the received packet, adding a new metadata entry to the RPA with the SID and the SSN for the received packet.

9. The method of claim 8, further comprising determining if the RPA is full prior to adding the new metadata entry and, if the RPA is full, discarding the SID and the SSN for the received packet.

10. A mesh network device having replay protection, comprising:
    a network interface configured to receive packets from a mesh network;
    a message cache having a replay protection area (RPA) and a flood protection area (FPA); and
    a packet security processor configured, for each received packet,
       to generate metadata associated with the received packet,
       to compare the metadata for the received packet to metadata entries stored for prior packets within the RPA to perform a replay protection check,
       to drop the received packet if the replay protection check is not passed,
       if the replay protection check is passed, to further compare the metadata for the received packet to metadata entries within the FPA to perform a flood protection check,
       to drop the received packet if the flood protection check is not passed, and to adaptively adjust a size of the RPA and a size of the FPA within the message cache such that if the size of the RPA is increased, the size of the FPA is decreased.

11. The mesh network device of claim 10, wherein, if the flood protection check is passed, the packet security processor is further configured to authenticate each received packet based upon a security key for the mesh network and to update the RPA or the FPA using the metadata for the received packet.

12. The mesh network device of claim 10, wherein the message cache has a fixed size, and wherein the packet security processor is configured not to adjust the size of the FPA below a minimum FPA size.

13. The mesh network device of claim 10, wherein the metadata for each received packet comprises a source identifier (SID) and a source sequence number (SSN) for the received packet, and wherein the metadata entries comprise a source identifier (SID) and a source sequence number (SSN) for previously received packets.

14. The mesh network device of claim 13, wherein the packet security processor is configured to consider the replay protection check and the flood protection check as passed:
   if there is no SID within the RPA or the FPA, respectively, that matches the SID for the received packet, or
   if there is an SID match within the RPA or the FPA, respectively, the SSN for the received packet is greater than an SSN stored in a metadata entry along with the matching SID.

15. The mesh network device of claim 13, wherein the packet security processor is further configured, if the mesh network device is a destination device for the received packet, to update the RPA and the FPA by:
   if the RPA includes a metadata entry with a matching SID to the SID for the received packet, updating the metadata entry within the RPA with the SSN for the received packet;
   if the RPA does not include a metadata entry with a matching SID to the SID for the received packet and the FPA includes a metadata entry with a matching SID to the SID for the received packet, updating the metadata entry within the FPA with the SSN for the received packet; and
   if the RPA and the FPA do not include a metadata entry with a matching SID to the SID for the received packet, adding a new metadata entry to the FPA with the SID and the SSN for the received packet.

16. The mesh network device of claim 15, wherein the packet security processor is further configured to determine if the FPA is full prior to adding the new metadata entry and, if the FPA is full, to replace an oldest existing metadata entry within the FPA with the SID and the SSN for the received packet.

17. The mesh network device of claim 13, where in the packet security processor is further configured, if the mesh network device is not a destination device for the received packet, to update the RPA by:
   if the RPA includes a metadata entry with a matching SID to the SID for the received packet, updating the metadata entry within the RPA with the SSN for the received packet; and
   if the RPA does not include a metadata entry with a matching SID to the SID for the received packet, adding a new metadata entry to the RPA with the SID and the SSN for the received packet.

18. The mesh network device of claim 17, wherein the packet security processor is further configured to determine if the RPA is full prior to adding the new metadata entry and, if the RPA is full, to discard the SID and the SSN for the received packet.

* * * * *